United States Patent Office 3,535,116
Patented Oct. 20, 1970

3,535,116
PROCESS FOR THE CONTINUOUS PRODUCTION OF WORT
Eugen Harsanyi, Trierer Strasse 47, Cologne, Germany
Filed Dec. 20, 1966, Ser. No. 603,316
Claims priority, application Germany, Dec. 24, 1965, 1,442,240
Int. Cl. C12c 7/00, 7/04, 7/06
U.S. Cl. 99—52                                    3 Claims

ABSTRACT OF THE DISCLOSURE

A process for the production of sweet brewer's wort whereby mash is continuously delivered to two successive centrifugal extraction zones, each zone comprising a container defining three separate compartments: a conical sieve rotating about a horizontal axis in the first two compartments in each zone, the third compartment of the first zone being a discharge to the first compartment of the second zone, and the third compartment of the second zone being a final discharge of the mash solids. The mash introduced into the first compartment of the first extraction zone slides outwardly along the sieve into the second compartment, then to the discharge compartment for similar travel through the second zone. Fresh water is used as sparging water for the mash solids in the second compartment of the second zone and the liquid effluent is used as the sparging fluid in the previous compartment, the final wort being the sparging effluent of the first compartment of the first zone.

---

This invention relates to a continuous method for the production of sweet brewer's wort. More specifically, this invention is directed to a continuous method for the production of such wort as is delivered to the brew kettle with hops added.

Briefly, wort of the above-mentioned kind has heretofore been produced by mixing more or less finely ground, kiln-dried malt with water in a masher, converting the starch into maltose and dextrins at temperatures of approximately 130 to 167° F., and clarifying the fermentable mash slurry by separating the liquid from the solids or spent grains. Heretofore, the separation of the wort from the insoluble grain residue has required three to four hours and may require even five hours and more, depending on the quality of the malt processed, on the type of clarifying or separating apparatus employed, and on the fineness of the ground malt. Sometimes filter presses are used also.

To obtain a higher yield of wort, it is desired that the malt be as finely ground as possible. On the other hand, considerable difficulties will be encountered in the straining or filtering of wort that is produced from finely ground malt. Thus considerably more time is required to separate the wort from the spent grains and to clarify it, and large quantities of sparging water are needed to complete the extraction. To obtain a wort of desired concentration, the sparging water has to be removed from the wort in the brew kettle, which is a costly undertaking because of the energy and time required.

In the past, the above-noted problems have made it difficult to produce wort and separate it from the spent grains by a continuous method. Attempts have been made to overcome these difficulties by the use of centrifuges. Such attempts, however, have not been successful, particularly, since the malt proteins will be destroyed when employing certain types of centrifuges.

Nor have those attempts led to a reduction of the total amount of energy required, because it is still necessary to remove large quantities of sparging water from the brew kettle, requiring considerable energy.

It is accordingly a primary object of this invention to provide a process for the production of sweet wort by which the wort may be produced continuously with a corresponding saving of time and separated continuously from the solids, and in which sparging water is required only in relatively small quantities so that a wort is obtained whose concentration at least approximates already the desired final value, prior to bringing the wort to a boil in the brew kettle. In other words, the final boil of the wort in the brew kettle with hops added serves only to sterilize the wort, destroy the enzymes, precipitate the protein material and to caramelize the sugar, rather than to make the wort more concentrated.

According to the invention, a process for the continuous production of wort comprises the steps of separating by centrifugal action the ground malt-water mixture continuously and at least in two stages into a solids fraction and a liquid fraction, sparging the largely dehydrated solids fraction with water in controlled quantities at least in the last stage, removing the dehydrated solids, subjecting the liquid obtained by the centrifugal action to clarification and delivering the clarified liquid to the brew kettle.

The separation of the liquid from the solids is accomplished by means of a special type of centrifuge known per se. The centrifuge has a housing in which a conical, perforated drum is rotatably mounted. The housing has a first chamber with two compartments and separate liquid outlets and a second chamber for the removal of the solids, the second chamber being arranged at the larger diameter drum end. The mash slurry to be separated is delivered gently into the centrifuge at its smaller diameter drum end.

Disposed within the drum is a hollow shaft having two separate liquid passages to which jet pipes are connected. The shaft rotates at a speed slightly less than that of the perforated drum.

As will be described more fully hereinafter, the extraction of the wort by the process of the invention may be done by the direct current, counter current or combined direct-counter current technique.

The continuous process of the invention has the following outstanding advantages:

The energy requirements may be reduced to about 50%. The separation time is reduced to about 75% of the time heretofore required to separate the wort in a lauter tub. The separating equipment need not to be cleaned. Thanks to the intense extraction effect of the centrifuges, spraging water need be added only in limited quantities, so that the wort will have its desired concentration as it enters the brew kettle, whereby the length of boil may be reduced. The entire system is easy to clean by passing water continuously through the various parts of the system. The malt may be ground to a very fine flour whereby a higher yield of wort is obtained.

Further details and advantages of the process of the invention will become apparent from the following description and the appended drawings in which several embodiments of the process are illustrated by way of example only. In the drawings, FIG. 1 is a flow chart of one embodiment of the process of the invention, in which the mash is subjected to separation;

Figure 1:
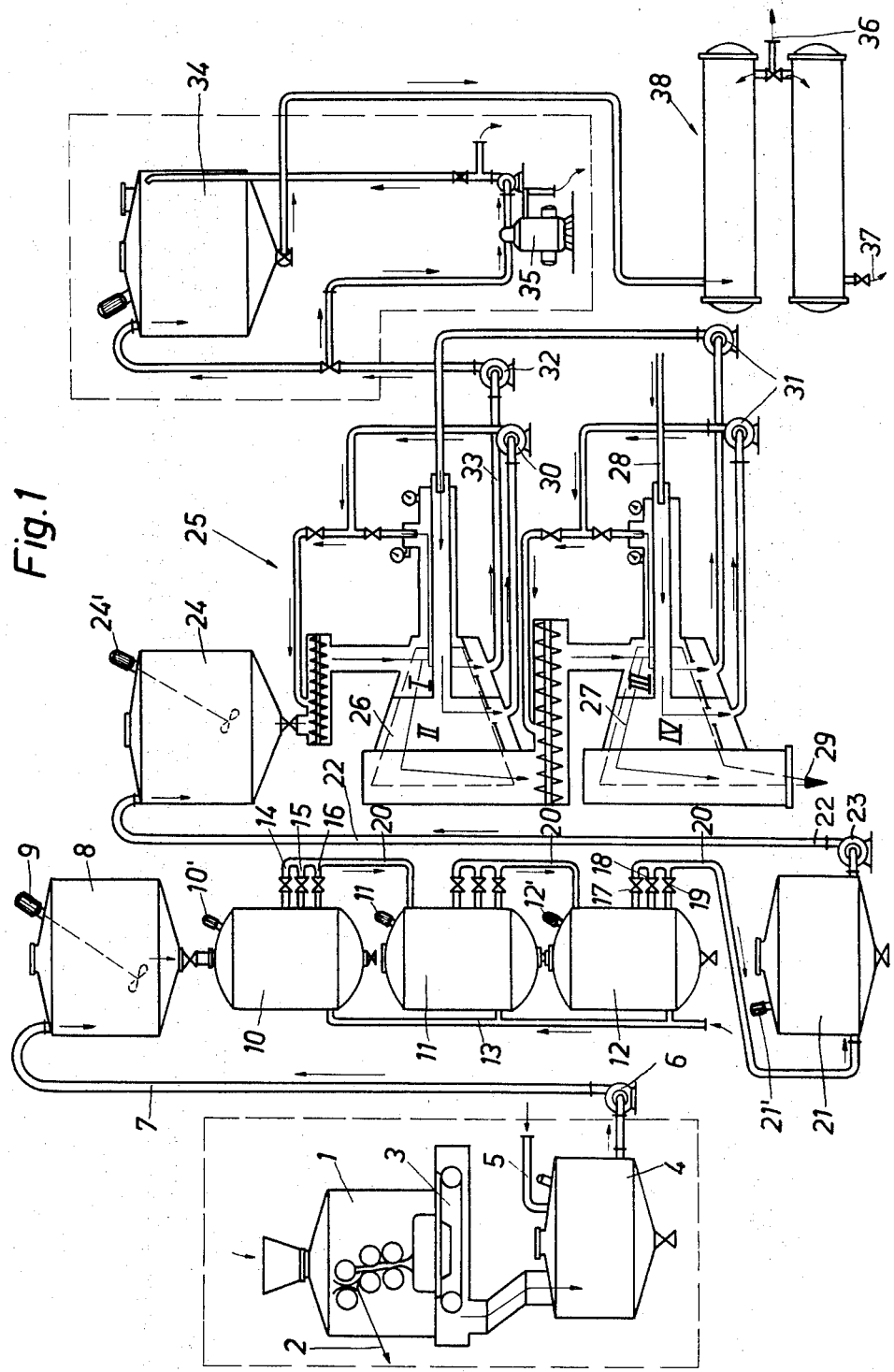

Referring now more particularly to FIG. 1, there is shown at 1, a malt mill in which the malt is crushed. The husks leave the malt mill 1 at 2 and the flour as well as the coarsely ground matter are delivered to an automatic weighing machine 3 from which they are fed in controlled quantities to a slurrying vessel or tank 4 in which they are mixed with water which is delivered in controlled quantities to vessel 4 through piping 5. A pump 6 is arranged to deliver the resulting slurry or mixture through pipe 7 to an intermediate tank 8 in which an agitator 9 is disposed. The intermediate tank 8 is not absolutely necessary. It may, however, be used to advantage as storage tank.

Connected to the outlet of intermediate tank 8 is a series of heat exchangers 10, 11, 12, to which a heating medium, such as superheated steam is delivered, which passes from a common supply line 13 through heating coils not specifically shown in the drawings. Each heat exchanger 10, 11, 12 is equipped with an agitator 10′, 11′, and 12′, respectively, and with three outlet lines 14, 15, and 16 in which control valves 17, 18 and 19 are respectively inserted. The three outlet lines 14, 15, 16 of each heat exchanger are interconnected to open into a common line 20, the arrangement being such that each line 20 connects to the next following heat exchanger at its top, with the last line 20 opening into a collecting tank 21.

By the superposed arrangement of outlet lines 14, 15, 16 of heat exchangers 10, 11, 12, it is possible, by proper actuation of their associated control valves 17, 18, 19, to control the hold-up time of the mash slurry in the respective heat exchangers.

In the first heat exchanger 10 the malt-water mixture is heated to a temperature of about 130° F., whereby it is gelatinized. In the second heat exchanger 11 the mash is reduced to a liquid state by heating it to approximately 140 to 150° F. Finally, it is delivered to the last heat exchanger 12 in which the starch is converted to sugar at temperatures of about 160 to 168° F.

The mash then enters a collecting tank 21 which is also provided with stirring means as shown at 21′. A pump 23 is arranged to deliver the mash from tank 21 through a pipe 22 to an intermediate tank 24 in which an agitator 24′ is disposed. The outlet of tank 24 is connected to the separating plant generally indicated at 25 which in the embodiment shown comprises two two-stage jet centrifuges or extractors 26, 27. The individual stages of the two centrifuges bear the reference numerals I, II, III, and IV, respectively. The flow chart of separating plant 25 is is illustrated by FIG. 2a, and a design of the centrifuges employed in the separating plant is shown in the lower part of FIG. 3.

The mash coming from tank 24 enters stage I of centrifuge 26 in which the mash slurry is separated into a liquid fraction containing the liquid and fines solids and a solids fraction containing coarser solids, the sludge-like solids fraction sliding along the flaring surface of the drum into stage II of the separator where it is sparged with wash effluent from stage III of centrifuge 27. The wort obtained in stage I is delivered to the brew kettle through stations still to be described, while any solids which may still be present after the sludge-like mass has passed through stage II are delivered to stage III of centrifuge 27.

Extraction of the solids in stage III is accomplished with wash effluent from the succeeding stage IV, whereas extraction in stage IV is effected with hot water which is delivered to this stage through a pipe 28. At the end of the extraction process, the substantially fully exhausted coarse solids waste leaves the two-stage separator 27 at 29. Circulation of the wash effluents is done with pumps 30, 31. A pump 32 serves to deliver the wort to successive processing stations.

In the two centrifuges 26, 27 substantially no grain residue is separated from the liquid, since spent grains are present in very small amounts only. This is so because the malt husks have already been previously separated from the comminuted malt in malt mill 1, as indicated by arrow 2. What is separated from the wort in the two-stage centrifuges is a sludge-like mass that was obtained by depositions in the heat exchangers during the conversion of the starch into sugar.

The liquid drawn off from stage I by pump 32 through line 33 passes either through a centrifuge 35 to achieve greater clarity or directly to a wort collecting tank 34. From collecting tank 34 the wort is then delivered to the brew kettle. Since the wort has already at least approximately its final concentration, a single- or multi-stage continuous flow heater generally indicated at 38 may be used as brew kettle. Having passed through the heater, the wort may then be drawn off at 36 or 37.

Of course, one or several of the conventional mash tubs may be substituted for heat exchangers 10, 11, 12 in the mashing process. In this case the process would be quasi-continuous, the mash tubs emptying their batches of mash into the large-size vessel 34 which is used as temporary storage tank.

Figure 2:
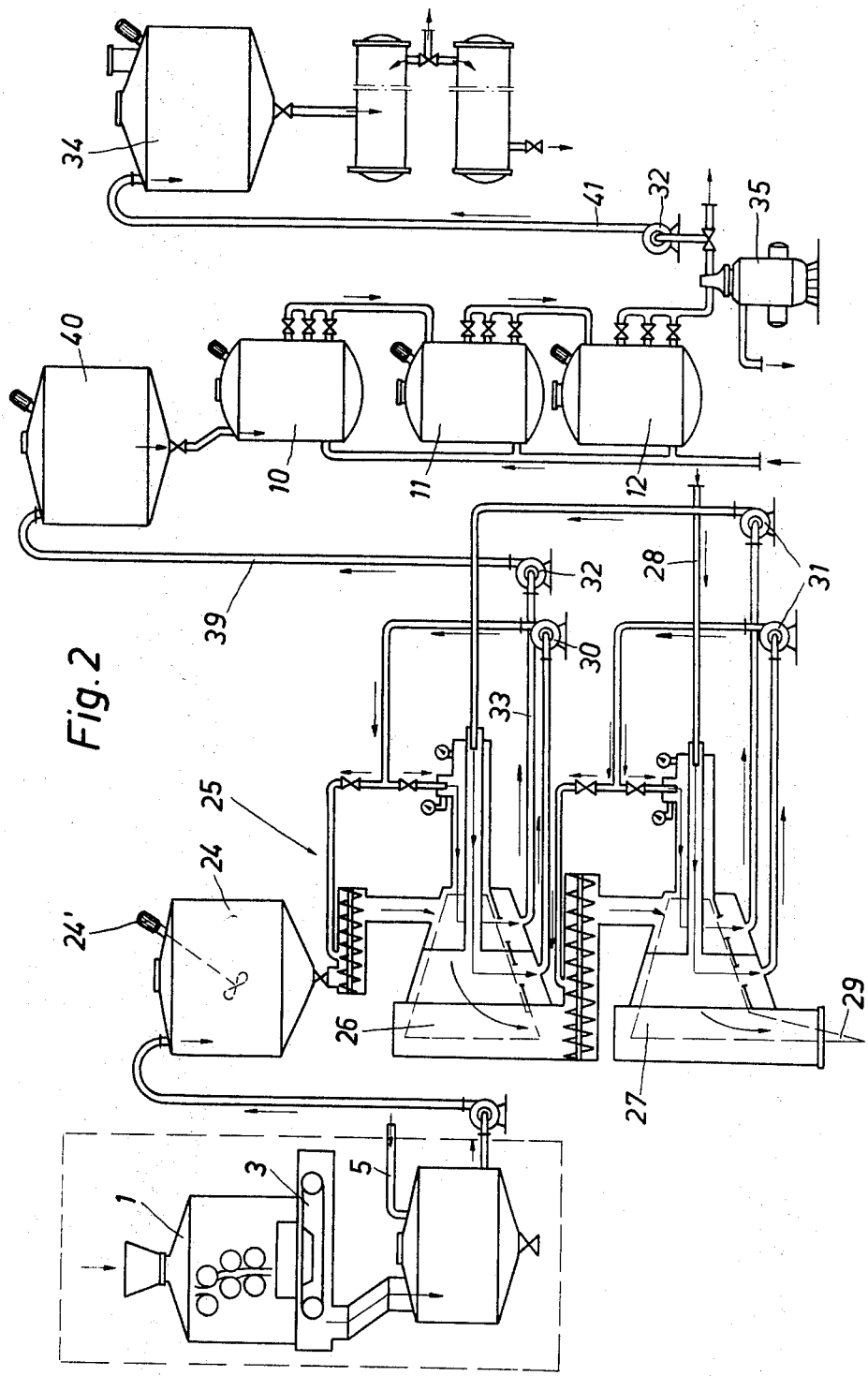
FIG. 2 is a flow chart of another embodiment, in which a non-mashed malt-water mixture is subjected to separation.
Figure 2A:
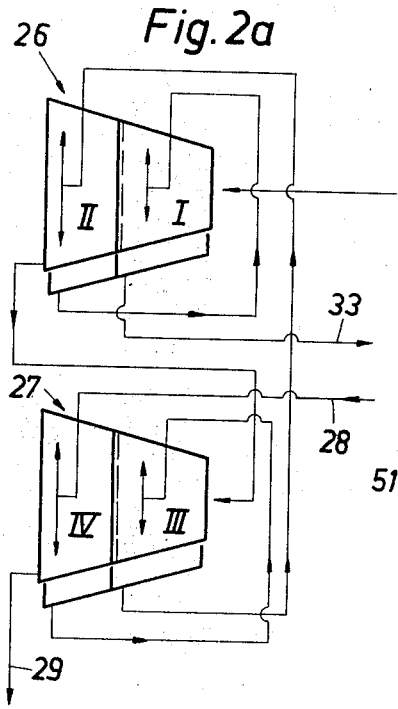
FIG. 2a is a detailed flow chart of the separating plant of FIGS. 1 and 2 employing counter-current extraction.

Reference will now be had to FIG. 2 which shows a modification of the process of FIG. 1. Parts of the system which correspond to those of the system of FIG. 1 bear similar reference numerals.

In the system shown in FIG. 2, the finely ground malt is processed together with husks or chaff. The malt grist coming from malt mill 1 enters the slurrying or mixing vessel 4 in which it is mixed with water and heated to approximately 95° F., the water being delivered through pipe 5. The resulting mixture, which consists of water, flour, coarser solids and husks, is then delivered through intermediate tank 24 to the two extractors or centrifuges 26, 27, which are arranged and operated in much the same way as the centrifuges of the previously described process of FIG. 1, with the exception, however, that the product obtained in stage I of centrifuge 26 is no wort but a milky liquid which contains the flour in a dissolved state as well as coarse and fines solids. In the separating plant 25 the husks and chaff are separated from the liquid.

Having passed through separating plant 25, the liquid is delivered through line 39 to tank 40 or directly to heat exchangers 10, 11, 12 for gelatinization, reduction to a fluid state, and conversion into sugar. The operation of the heat exchangers is the same as that described in detail in conjunction with the process of FIG. 1. At the outlet of the last heat exchanger 12 a centrifuge is arranged which serves the purpose of separating the mash from scum.

The wort leaving centrifuge 35 is then delivered through line 41 to tank 34 in which the hops are added to the wort just as is the case in the system of FIG. 1.

The arrangement of the separating plant of FIG. 2 corresponds to that of the plant of FIG. 2a.

Other arrangements of the centrifuges of the separating plant 25 in FIGS. 1 and 2 will now be described.

Figure 3A:
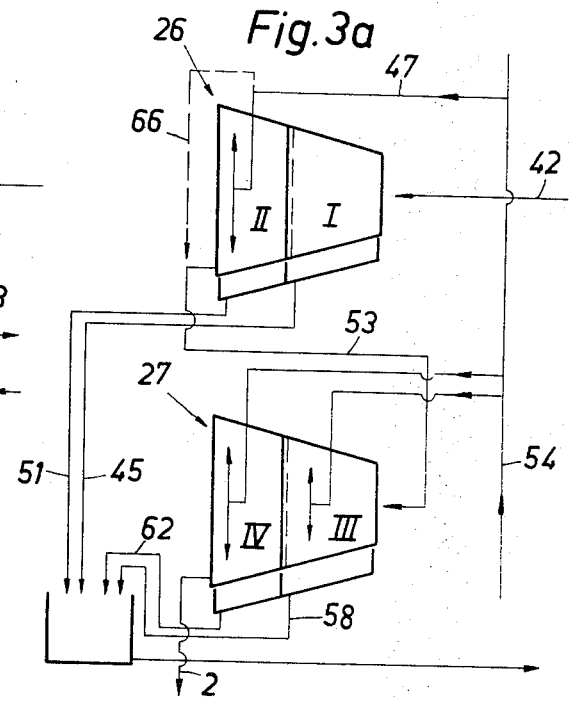
FIG. 3a is a flow chart of the separating plant of FIG. 3.
Figure 3:
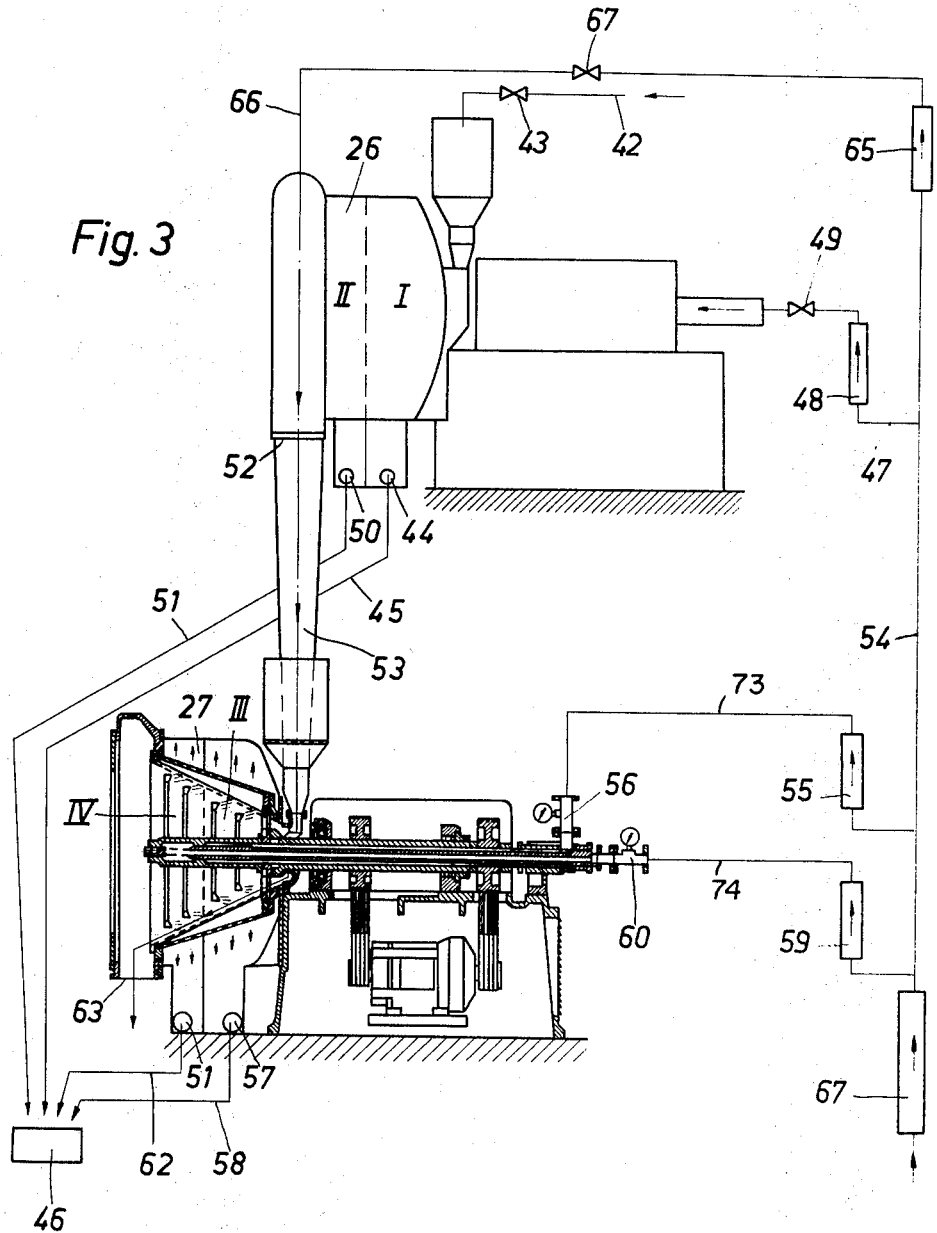
FIG. 3 is a schematic diagram of a separating plant employing direct-current extraction, one of the extraction centrifuges being shown in section for greater clarity.

In the arrangement illustrated by FIGS. 3 and 3a two jet centrifuges or extractors are connected in tandem. The mash is run into centrifuge 26 through line 42, in which a control valve 43 is inserted. To avoid the entrance of air, which may cause the wort to oxidize, an airtight connection should preferably be provided between the lines and the centrifuges.

In the first stage, I, the so-called first wort is separated from the insoluble grain residue by centrifugal action and is run through outlet aperture 44 and line 45 into a wort collecting tank 46, which is shown on a reduced scale with respect to the other apparatus depicted in the figure. Again, an airtight connection should be provided between the lines and the wort collecting tank to prevent an oxidation of the wort.

The spent grains from stage I then enter stage II of centrifuge 26 where they are mixed with hot water that is fed into the stage through a branch line 47 in which a volumeter 48 and a control valve 49 are inserted. In this way the spent grains are reslurried for further extraction. The liquid separated from the insoluble grain residue in stage II is then run through outlet aperture 50 and line 51 into collecting tank 46. Having passed through stage II, the spent grains are in a rather dry state. They are then dropped through an aperture 52 and a hopper 53 into stage III of centrifuge 27 where they are again subjected to extraction by mixing them preferably with hot water, which is delivered to stage III through a branch line 73, and separating the coarse solids from the slurry. The supply of water to stage III may be controlled by means of a regulating valve 56 and a volumeter 55 which are inserted into branch line 73. The liquid centrifuged from the coarse solids in stage III flows through an outlet aperture 57 and a pipe 58 into the collecting tank, whereas the spent grains extracted in stage III pass into stage IV of centrifuge 27 where they are again mixed with water from a branch line 74 in which a volumeter 59 and a control valve 60 are inserted. The branch lines 47, 73 and 74 connect to the main supply line 54. In stage IV substantially all of the residual wort is extracted from the spent grains, leaving a substantially thoroughly exhausted coarse solids waste behind. The water enriched with the residual wort passes through an outlet aperture 51 and a line 62 into wort collecting tank 46. The insoluble coarse solids waste is removed through an aperture 63 in centrifuge 27. If desired, it may be pressed out as between squeezing rolls or in a screw press not shown in the drawings. The resulting liquid is also run into wort collecting tank 46. The overall consumption of hot water is indicated by a volumeter 64 and may be recorded, if desired.

Figure 4A:
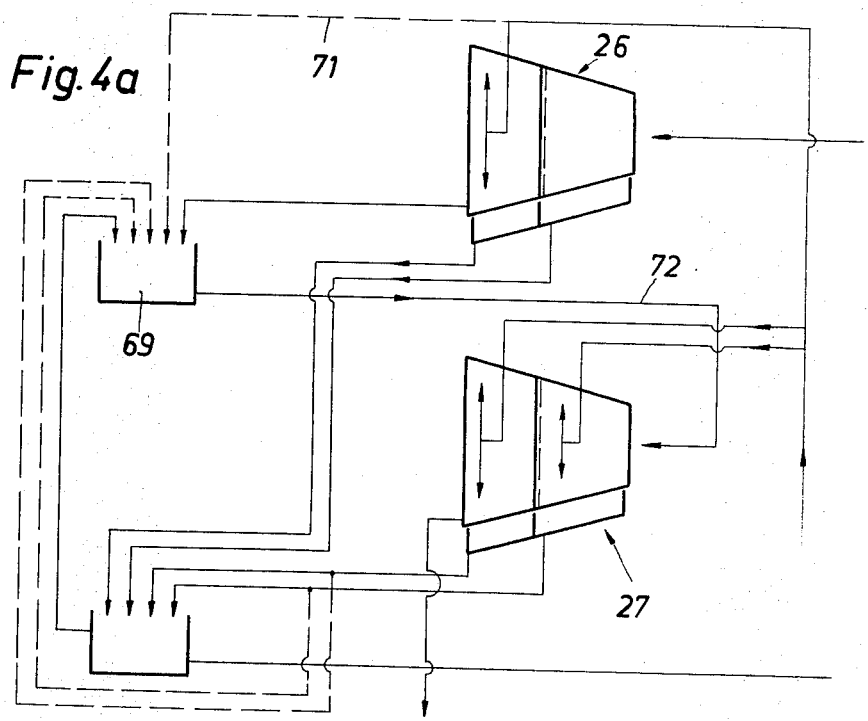
FIG. 4a is a flow chart of the separating system of FIG. 4.
Figure 4:
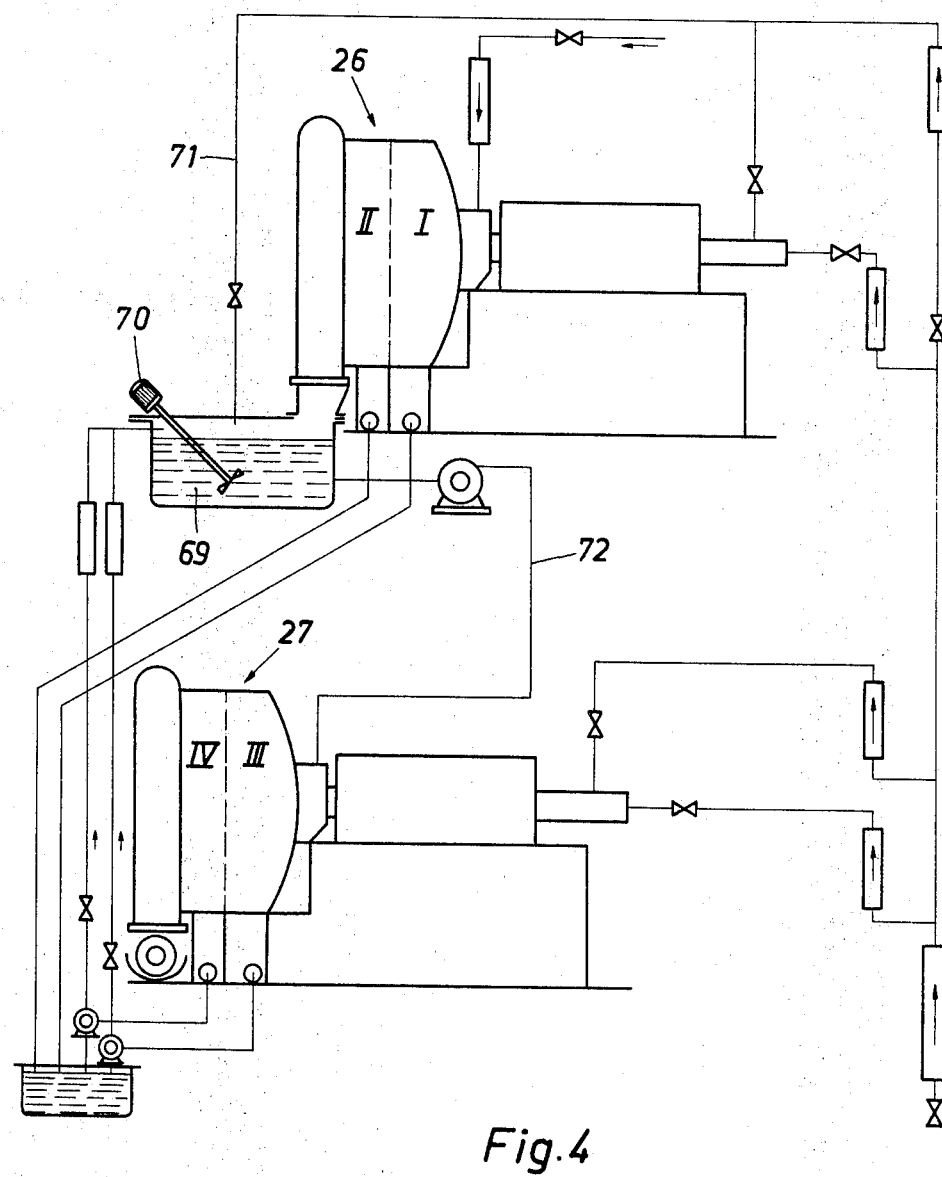
FIG. 4 is a schematic diagram of a separating plant employing combined direct-counter current extraction.

FIG. 3a is a simplified flow chart of the separation process just described. As becomes apparent from this figure, this process employs the direct-current extraction technique as opposed to the separation process of FIGS. 4 and 4a in which the slurry is subjected to direct and counter current extraction. As can be readily seen, the arrangement of FIGS. 4 and 4a corresponds essentially to that of FIGS. 3 and 3a, with the exception that the grain residue obtained in stage II is not delivered directly to stage III of centrifuge 27 but to an intermediate tank 69 with stirring means 70 where it may be reslurried with water delivered through a pipe 71 or with wash effluent from stages III and IV or with a mixture of liquids from all stages. The reslurried grain residue is then delivered through a pipe 72 to stages III and IV of centrifuge 27.

To facilitate the passage of separated grain residue through hopper 53 (FIG. 3), water may be run into the hopper through a pipe 66 in which a volumeter 65 and a control valve 67 are inserted.

It should be noted that the hot-water supply lines 28 of FIGS. 1 and 2 are also provided with volumeters and regulating valves which have been omitted for sake of clarity.

Having thus described my invention, what I claim as new and desire to secure by Letters Patent is:

1. In a process for the production of sweet brewer's wort, the steps of
   (1) continuously delivering mash for continuous centrifugal extraction, the extraction being effected in two successive extraction zones each comprising a container defining three separated compartments and a conical sieve mounted for rotation about a horizontal axis in the container and flaring through a first and second zone of said compartments to a last one of said compartments, the mash being delivered to the first compartment of the first extraction zone;
   (2) continuously centrifugally separating the mash into the solids fractions and liquid fractions in said extraction zones,
      (a) the solids fraction in the first compartment of the first extraction zone being retained on the sieve, continuously sliding on the flaring sieve into the second compartment of the first extraction zone, and continuously discharging into the third compartment of the first extraction zone, the discharged solids fraction being continuously fed to the first compartment of the second extraction zone where it is retained on the sieve, continuously slides down on the sieve into the second compartment of the second extraction zone, and is continuously discharged into the third compartment of the second extraction zone whence it is continuously removed, and
      (b) the liquid fraction in the first compartment passing through the sieve in a first extraction stage as wort, and the liquid fractions in the second compartment of the first extraction zone and in the first and second compartments of the second extraction zone passing through the sieve in successive extraction stages as thin wort;
   (3) continuously delivering the wort from the first extraction stage to a brew kettle;
   (4) continuously sparging the solids fraction in the first compartment of the first extraction zone by feeding the thin wort from the second compartment of the first extraction zone thereto;
   (5) continuously sparging the solids fraction in the second compartment of the first extraction zone by feeding the thin wort from the first compartment of the second extraction zone thereto;
   (6) continuously sparging the solids fraction in the first compartment of the second extraction zone by feeding the thin wort from the second compartment of the second extraction zone thereto; and
   (7) continuously sparging the solids fraction in the second compartment of the second extraction zone by feeding a controlled amount of water thereto.

2. In the process of claim 1, the further step of preparing the mash by crushing kiln-dried malt, mixing the comminuted malt with water, separating spent grains from the water, adding hops to the liquid thus obtained, and subjecting the liquid to elevated temperatures.

3. In the process of claim 1, the steps of controlling the amount of sparging liquids in said successive extraction stages so that the wort removed from the first extraction stage has a desired concentration prior to entry into the brew kettle.

References Cited

UNITED STATES PATENTS

| | | | |
|---|---|---|---|
| 1,920,461 | 8/1933 | Clark | 99—51 |
| 2,513,687 | 7/1950 | Strezynski | 99—51 |
| 2,726,957 | 12/1955 | Kunz | 99—52 |
| 2,894,841 | 7/1959 | Compton et al. | 99—52 |

LIONEL M. SHAPIRO, Primary Examiner

W. C. LAWTON, Assistant Examiner

U.S. Cl. X.R.

99—50, 51, 278